United States Patent [19]
Kondo et al.

[11] Patent Number: 5,150,616
[45] Date of Patent: Sep. 29, 1992

[54] SEMICONDUCTOR STRAIN SENSOR AND MANUFACTURING METHOD THEREOF

[75] Inventors: Munenari Kondo, Mie; Masahito Imai, Aichi; Ryoichi Narita, Aichi; Takushi Maeda, Aichi, all of Japan

[73] Assignee: Nippondenso Co., Ltd., Kariya, Japan

[21] Appl. No.: 575,526

[22] Filed: Aug. 31, 1990

[30] Foreign Application Priority Data

Sep. 21, 1989 [JP] Japan .................................. 1-245852

[51] Int. Cl.⁵ .............................................. G01P 15/08
[52] U.S. Cl. ............................................... 73/517 R
[58] Field of Search ................. 73/774, 775, 777, 493, 73/517 R, 522, 754; 338/2-6, 47

[56] References Cited

U.S. PATENT DOCUMENTS

| | | | |
|---|---|---|---|
| 3,609,624 | 9/1971 | Nagy | 338/2 |
| 3,923,581 | 12/1975 | Payne et al. | 361/411 |
| 4,829,822 | 5/1989 | Imai et al. | |
| 4,967,605 | 11/1990 | Okada | 73/777 |
| 4,987,781 | 1/1991 | Reimann | 73/517 R |

FOREIGN PATENT DOCUMENTS 50-105285  8/1975  Japan .
54-41306  12/1979  Japan .
0302119  12/1989  Japan .................................. 73/517 R

OTHER PUBLICATIONS

"A Batch—Fabricated Silicon Accelerometer" by L. M. Roylance et al; IEEE Transactions on Electron Devices, vol. ED-26, No. 12, Dec. 1979.
Journal of Nippondenso Technical Disclosure by Tsuzuki; Mar. 15, 1987.

*Primary Examiner*—Robert Raevis
*Attorney, Agent, or Firm*—Cushman, Darby & Cushman

[57] ABSTRACT

A semiconductor strain sensor having a stem with a lead hole in which a lead terminal is installed and electrically coupled to an external circuit. A sensor chip having piezo-resistors to a bride circuit is joined with a front surface of the stem. A shell is joined with the front surface of the stem by projection welding after the back surface of the stem is flattened to within a predetermined limit. A space formed by the shell and stem is filled with a damping liquid. The stem is integrally coupled to the sensor chip through an adhesive, and spacers are added to the adhesive to keep the thickness of the adhesive to a predetermined value. This arrangement can effectively prevent propagation of the welding strain of the stem from adversely affecting the sensor chip.

5 Claims, 8 Drawing Sheets

SEMICONDUCTOR STRAIN SENSOR AND MANUFACTURING METHOD THEREOF

BACKGROUND OF THE INVENTION

The present invention relates to a semiconductor strain sensor such as a semiconductor accelerometer and a pressure sensor, and methods of manufacturing such semiconductor strain sensing devices.

A conventional semiconductor accelerometer is provided with a beam portion on its sensor chip (silicon chip) which has piezo-resistors so as to form a bridge circuit. The beam portion, being disposed in the air, has a resonance frequency determined by its shape and the resonance output thereof, which is an output value obtained when a cantilever, the beam portion, enters into a resonance state, reaches about 1000 times the output under the normal conditions, thereby providing the possibility that the beam portion is easily broken. For eliminating this problem, the sensor chip is adhered or bonded to a stem, and a shell is provided to surround a sensor chip by means of the projection welding technique before enclosing therein damping liquid such as silicon oil.

There is a problem which arises with this arrangement, however, in that the stem welding strain is propagated up to the sensor chip so that the offset voltage of the bridge circuit formed on the sensor chip varies greatly. This will hereinbelow described in detail with reference to FIGS. 1 to 4. In FIGS. 1 and 2 showing a press process for manufacturing a stem illustrated as numeral 9, a belt-like steel plate 1 is initially machined so as to be partially removed to form at least one stem formation portion 2. Illustrated as numeral 3 is the removed portion. Secondly, coining is performed by means of a press so as to thin the circumferential portion 4 of the stem formation portion 2 to establish a step. Further, the stem formation portion 2 is machined by a punch so as to form six lead holes 6 each extending in directions perpendicular to surfaces of the belt-like steel plate 1. At this time, as shown in FIG. 2 which is a cross-sectional view taken along a line 2—2 in FIG. 1, the stem 9 partially warps due to the lead-hole formation, hence followed by the trimming process. Thereafter, a shell (10) is welded on the stem 9 by means of the projection welding with silicon oil being enclosed therein. Here, the stem 9 and the shell 10, as shown in FIGS. 3 and 4, are put on top of each other and disposed between upper and lower electrodes 7 and 8. The stem 9 is arranged to come into contact with the shell 10 at a portion indicated by a two-dot chain line (a) in FIG. 4 and fixedly welded thereto through pressurization. At this time, since a great force (about one ton) is applied to the stem 9, the stem 9 warps so as to produce a strain (about 190 micro (λ) strain). This strain is propagated into a sensor chip illustrated as numeral 11, causing the sensor characteristic to vary.

SUMMARY OF THE INVENTION

It is therefore an object of the present invention to provide a semiconductor strain sensor and manufacturing method which is capable of effectively preventing the propagation of the welding strain into the sensor chip.

According to the present invention, a semiconductor strain sensor comprises a substrate having a lead hole in which a lead terminal is installed so as to be electrically coupled to an external circuit and a sensor chip joined with the substrate and having piezo-resistors to a bridge circuit. A shell is further joined with the front surface of the substrate by means of a projection welding technique so as to cover the sensor chip, after the back surface of the substrate is flattened. The substrate is integrally coupled to the sensor chip through an adhesive, and spacers are added to the adhesive so as to keep the thickness of the adhesive to a predetermined value. More specifically, the thickness of the adhesive is arranged by the spacers to be above 100 μm and below 200 μm. This arrangement car effectively prevent the propagation of the welding strain of the substrate into the sensor chip.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 5:
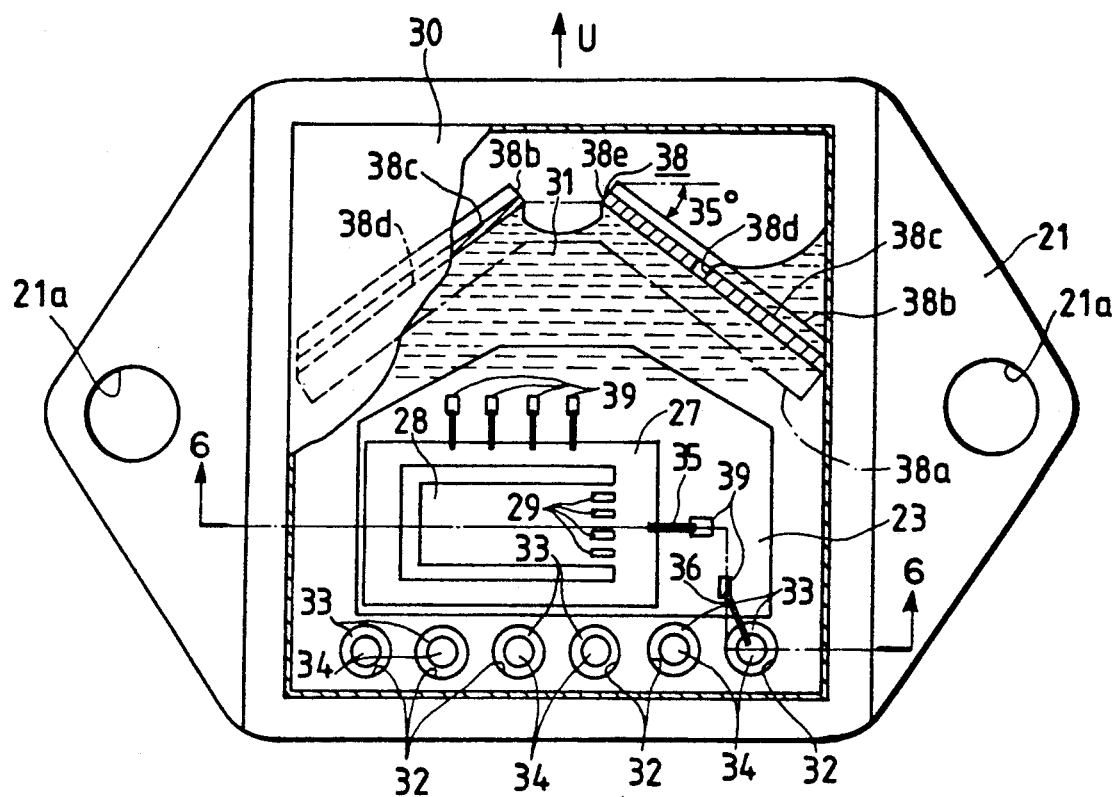
FIG. 5 is a plan view showing a semiconductor accelerometer according to the present invention.
Figure 6:
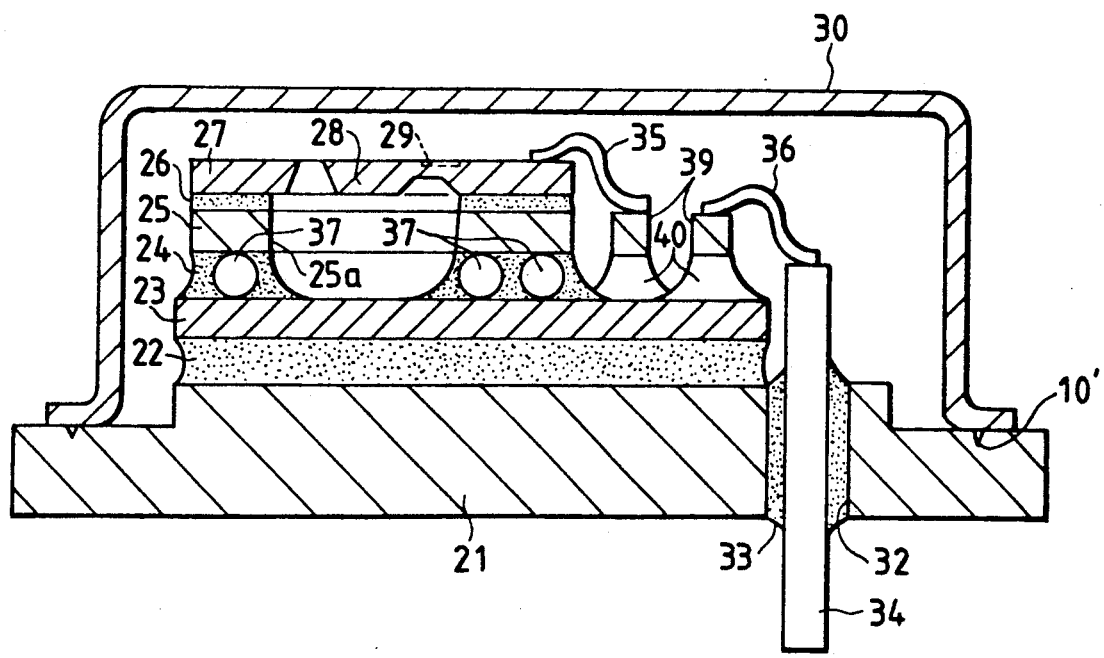
FIG. 6 is a cross-sectional view taken along a line 6—6 in FIG. 5.

Referring now to FIG. 5, there is illustrated a semiconductor accelerometer according to a first embodiment of the present invention, FIG. 6 being a cross-sectional view taken along a line 6—6 in FIG. 5. In FIGS. 5 and 6, illustrated at numeral 21 is a 42-alloy-made stem, on which a thick-film substrate 23 is disposed with an adhesive or a binding material 22 being interposed therebetween, whereby the thick-film substrate 23 and the stem 21 are joined to each other with the adhesive 22. Further, a silicon seat 25 is placed on the thick-film substrate 23 with an adhesive 24 being interposed therebetween and further a sensor chip 27 is located on the silicon seat 25 with an adhesive 26 being interposed therebetween. As a result, the stem 21, thick-film substrate 23, silicon seat 25 and sensor chip 27 are joined to each other with adhesives 22, 24 and 26 which may be epoxy resins. The sensor chip 27 is composed of a rectangular N-type silicon single-crystal substrate, and its center portion is equipped with a cantilever 28. The cantilever 28 has four piezo-resistor layers (P-type diffusion regions) 29 which are electrically coupled to each other so as to form a bridge circuit. A shell 30 is integrally coupled to the stem 21 by means of the projection welding technique so as to hermetically cover and seal (or enclose) the thick-film substrate 23, silicon seat 25 and sensor chip 27. The shell 30 may be made of a metal such as an iron. In the space formed by the stem 21 and the shell 30, there is provided a damping liquid such as silicon oil 31 in order to prevent the resonance of the cantilever 28.

Furthermore, the stem 21 is arranged to have six lead holes 32, in which lead terminals 34 are hermetically sealed thereto using a hard glass 33. On the thick-film substrate 23 is formed a signal processing circuit comprising resistors and capacitors and being electrically coupled through lead wires 35, chip terminals 39 and solders 40 to the bridge circuit comprising the piezo-resistor layers 29 provided on the sensor chip 27, whereby the signal processing circuit processes (for example, amplifies) the output signal of the bridge circuit. Moreover, electrical connection between the lead terminals 34 and the signal processing circuit on the thick-film substrate 23 is made through solders 40, chip terminals 39 and lead wires 36. In response to application of acceleration to the sensor chip 27, the cantilever 28 is displaced so that the resistances of the piezo-resistor layers 29 vary in accordance with the magnitude of the acceleration. If a voltage is applied in advance to the bridge circuit, the bridge circuit generates an unbalanced voltage which is in turn led through the signal processing circuit and the lead terminals 34 to the outside. Here, the silicon seat 25 has at its center portion a hole portion 25a whereby, when the sensor chip 27 is exposed to an acceleration, the cantilever 28 can moves in accordance with the acceleration.

In FIG. 5 it is shown that in shell 30, there is provided a dividing device 38 having coupling portions 38a to the shell 30, coupling portions 38b to the stem 21 and two partition plates 38c. Each of the two partition plates 38c has a through-hole 38d, a damping liquid passage, and a through-hole 38e, a gas passage made between the two partition plates 38c. For mounting this semiconductor accelerometer on a motor vehicle, the direction indicated by U in FIG. 5 is arranged to be coincident with the upward direction of the motor vehicle (the direction opposite to the gravitational direction) and the direction perpendicular to the surface of the paper is arranged to be coincident with the advancing direction of the motor vehicle. Each of the partition plates 38c is disposed to make an angle of 35° with respect to directions perpendicular to the direction U, and the through-hole 38e is provided at the top portions of the partition plates 38c. Taking into account the expansion and contraction of the silicon oil 31 due to the temperature variation, a little air is additionally enclosed therein. The through-hole 38d for the damping liquid passage is disposed at the lower position as compared with the through-hole 38e, thereby returning the silicon oil 31 to the sensor chip 27 enclosing chamber side.

For connection of the dividing device 38 to the shell 30 and the stem 21, the coupling portions 38a are first welded to the shell 30, and the coupling portions 38b are compressed to the stem 21 with the width of the partition plates 38c being longer than the separation between the shell 30 and the stem 21. On the other hand, the semiconductor accelerometer itself is attached to the motor vehicle through mounting holes 21a.

Figure 1:
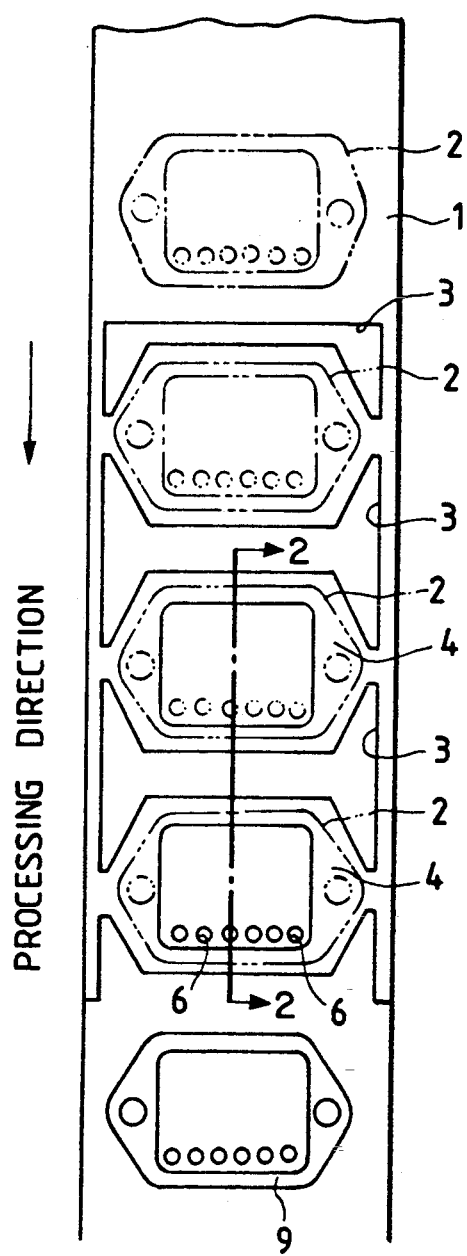
FIG. 1 is an illustration which shows a conventional press process for manufacturing a stem.
Figure 2:
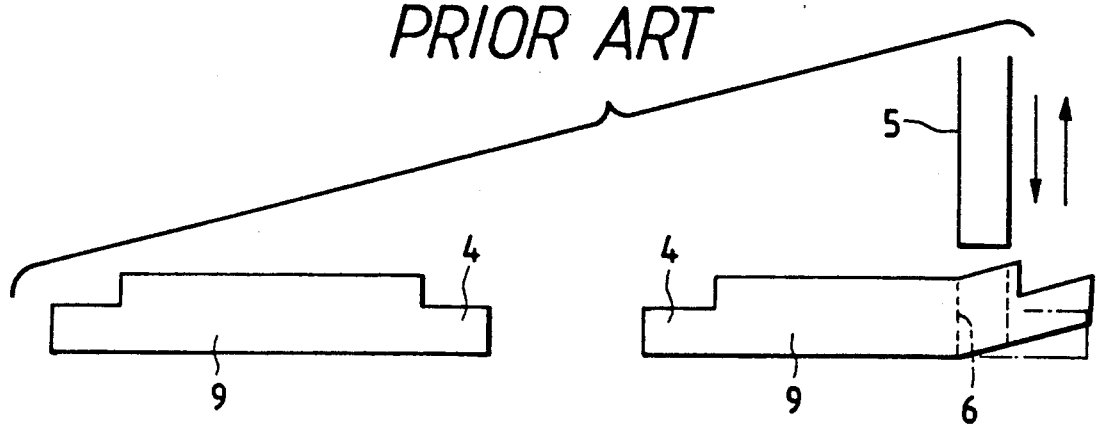
FIG. 2 is a cross-sectional view taken along a line 2—2 in FIG. 1.
Figure 3:
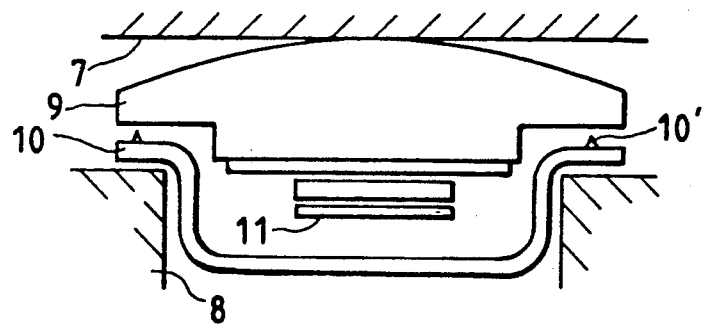
FIGS. 3 and 4 are illustrations for describing the projection welding.
Figure 4:
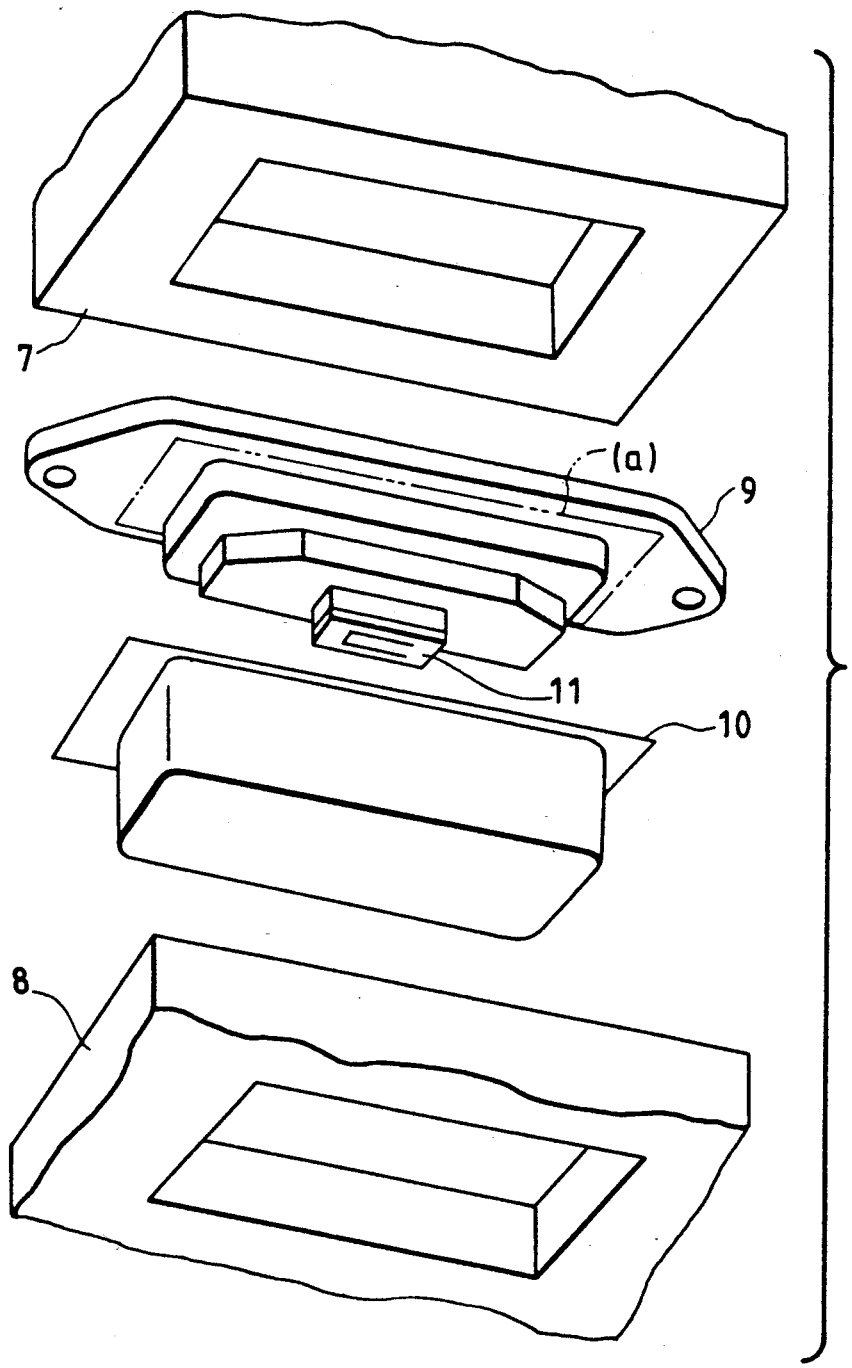

The stem 21 is manufactured by a press process as described with reference to FIGS. 1 and 2. That is, a belt-like steel plate is initially machined so as to be partially removed to form at least one stem formation portion and coining is then performed by means of a press so as to thin the circumferential portion of the stem formation portion to establish a step. Thereafter, the stem formation portion is machined by a punch so as to form six lead holes each extending in directions perpendicular to surfaces of the belt-like steel plate. At this time, as described above, the stem formation portion partially warps due to the lead-hole formation. According to this embodiment of the present invention, before the shell 30 is projection-welded with respect to the stem 21, the back surface (or rear surface) of the stem 21 is ground to be smoothed or flattened. Thereafter, as illustrated in FIGS. 3 and 4, the stem 21 and the shell 30, being overlapped, are placed between an upper electrode (7) and a lower electrode (8) and then combined with each other through the pressurization welding. The shell 30 has projections 10', the welding between the shell 30 and the stem 21 being performed through the projections 10' as illustrated in FIG. 6. Here, although a great force is applied to the stem 21, it is possible to prevent the stem 21 from warping or deforming because of being flattened.

Figure 7:
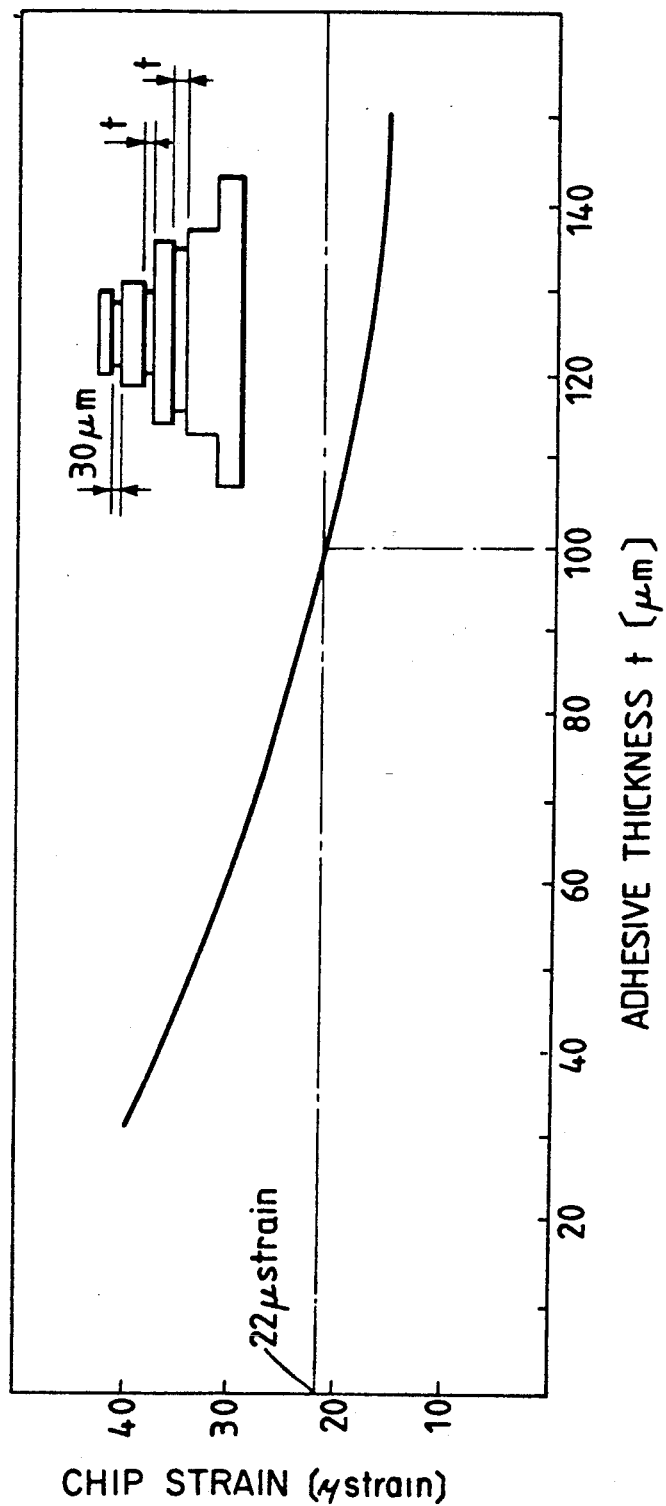
FIG. 7 is an illustration describing the relation between the strain of the sensor chip and the thickness of the adhesive.
Figure 8:
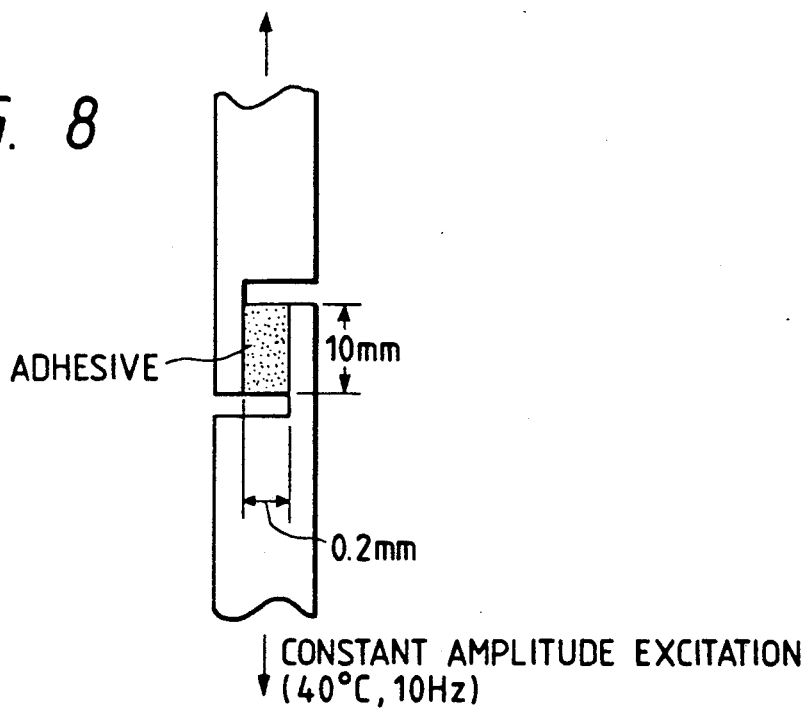
FIG. 8 shows the condition for a test of the strength of the adhesive.
Figure 9:
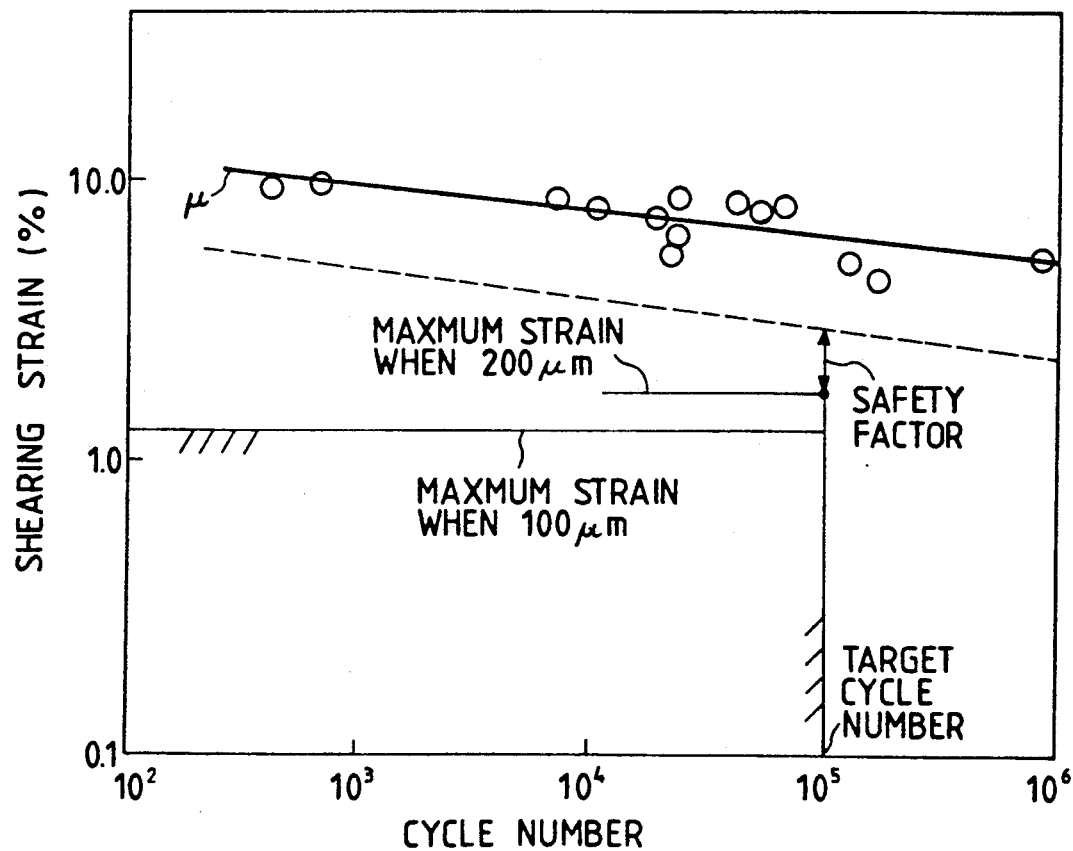
FIG. 9 is a graphic illustration describing the relation between the cycle number and the shearing strain.

Moreover, according to this embodiment, the thickness of the adhesive is increased in order to prevent the propagation of the welding strain resulting in the deformation of the stem 21 into the sensor chip 27. That is, as illustrated in FIG. 6, with dividing device 38 omitted for clarity glass beads 37 are added in the adhesive 24 for joining the thick-film substrate 23 and the silicon seat 25, thereby ensuring the thickness of the adhesive 24. These glass beads 37 are made of E-glass and have a diameter of 100 $\mu$m. The additional amount of the glass beads 37 is 5% of the weight of the adhesive including the beads. As compared with A-glass (soda glass), the E-glass has a characteristic that the dissolution of $Cl^-$ ion, $Na^+$ ion and others is as little as $\frac{1}{4}$ to 1/5, thereby substantially reducing an adverse affection with respect to the sensor chip (silicon wafer) 27. Here, as illustrated in FIG. 7, in order to the strain on the sensor chip 27 be below 22 micro strain ($\mu$ strain) which is an allowable value, the thickness of the adhesive 24 is required to be above 100 $\mu$m. Moreover, according to the test illustrated in FIG. 8 obtaining the cycle number, the number of times the stretching operation is performed in the directions indicated by the arrows in FIG. 8 until adhesive damage, by performing constant amplitude excitation having a frequency of 10 Hz, for example, under the conditions of $-40°$ C., it is possible to obtain the relation between the shearing strain and the cycle number as plotted in FIG. 9. As shown in FIG. 9 the adhesive (illustrated in FIG. 8) can be broken or exfoliated with a smaller cycle number as the shearing strain becomes greater. When the thickness of the adhesive is increased, the internal stress is increased so that the shearing strain rate is decreased. In FIG. 9 solid line $\mu$ designates the average value of strain versus cycle number; while the dotted line is solid line $\mu$ taking into account variances due to manufacturing. Thus, taking a targeted cycle number of $10^5$ obtained from a vehicle life time and accounting for manufacturing differences, the thickness of the adhesive needs to be 200 $\mu$m. This thickness is determined based on the average value, $\mu$, of the plotted strain values according to a finite element method and providing a for a safety factor of the shearing strain of 2 as show in FIG. 9. This thickness value corresponding to the maximum strain value that is designed to allow the adhesive to be exposed to a cycle number of $10^5$ and provide the desired safety factor of 2.

Figure 10:
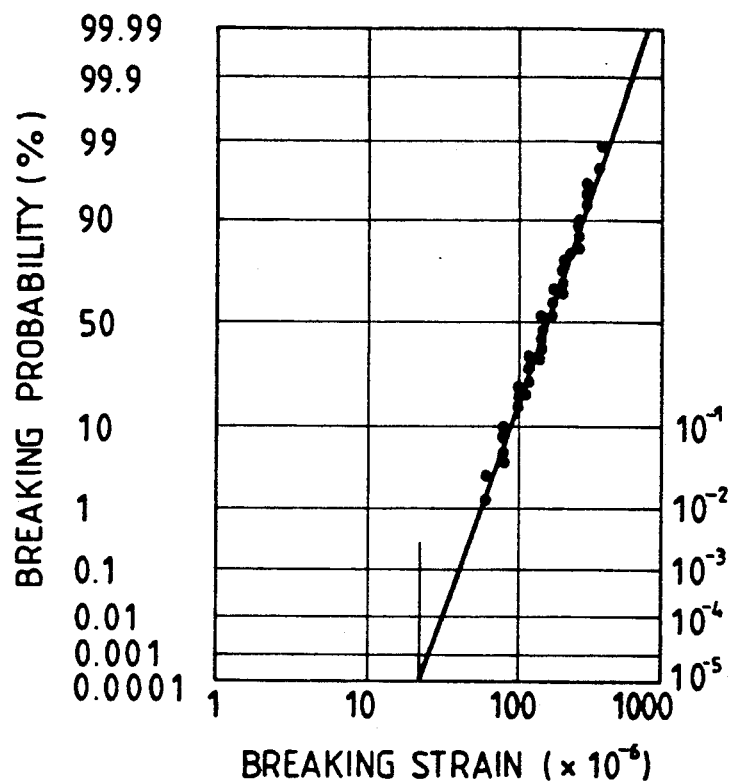
FIG. 10 is a graphic illustration showing the test results of the sensor chip.

A description will be made based on the fact that the allowable strain value of the sensor chip 27 is 22 μstrains (micro strains). In the test, a stage is adhered to a substrate through an adhesive and then a silicon chip is adhered to the stage through an adhesive. One end of the substrate is supported and a bending load is applied to the other end of the substrate. Under this condition, the strain produced on the silicon chip is measured by a strain gauge and the crack generated is observed. The observation method is such that the bending load is stepwise increased so as to find the strain immediately before generation of the crack. This strain is defined as the silicon chip strength. The test results are shown in FIG. 10. FIG. 10 shows the stress applied to the sensor ship versus the probability of a sensor chip break. When the breaking strain corresponding to the breaking probability of $10^6$ (i.e., the probability that the sensor chip will break) is obtained in accordance with the test results, it has been found that the strain value is $22 \times 10^{-6}$ (i.e. 22 micro strains). This value has been determined as the allowable strain value of the sensor chip 27.

Figure 11A:
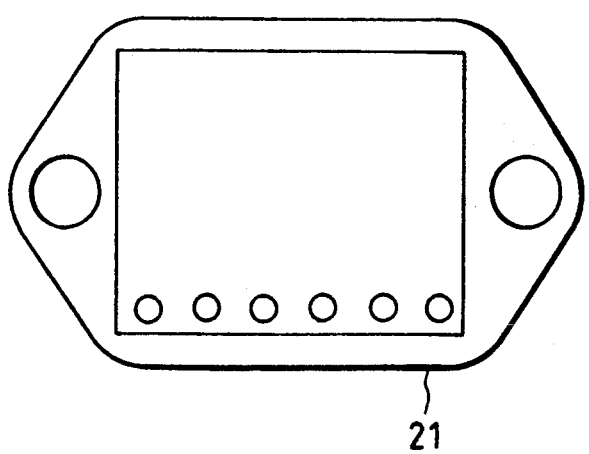
FIGS. 11A and 11B are illustrations for describing the flatness of the back surface of the stem.
Figure 11B:
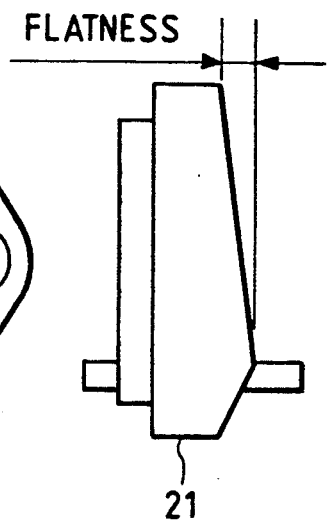

The deviation of a surface from being truly flat, of the back surface of the stem 21 illustrated in FIGS. 11A and 11B is preferred to be within 10 μm; this value being obtained in accordance with the following equation:

$$22 \ \mu strain = 110 \ \mu strain \cdot 0.6 \cdot 0.8 \cdot X/24$$

where X represents the flatness, 110 μstrain designates a conventional chip strain, 0.6 and 0.8 denote constants, and 24 is a conventional flatness.

The glass bead addition amount is determined to be below 5% of the weight of the adhesive with beads to prevent the modulus of elasticity from increasing. In addition, to prevent reduction of the adhesive strength due to addition of the glass beads, their glass surfaces are surface-treated by means of a coupling agent such as glycidylsilane so as to improve their wettability. Moreover, the mixing of the glass beads to the adhesive 24 is performed by means of a disperser so as to ensure sufficient kneading. Furthermore, in coupling the thick-film substrate 23 to the silicon seat 25, the adhesive material 24 including the glass beads 37 is applied on the thick-film substrate 23 and the silicon seat 25 and then pressed thereto, whereby it is possible to ensure that the thickness of the adhesive 124 becomes 100 substantially equal to the diameter of the added beads.

Figure 12:
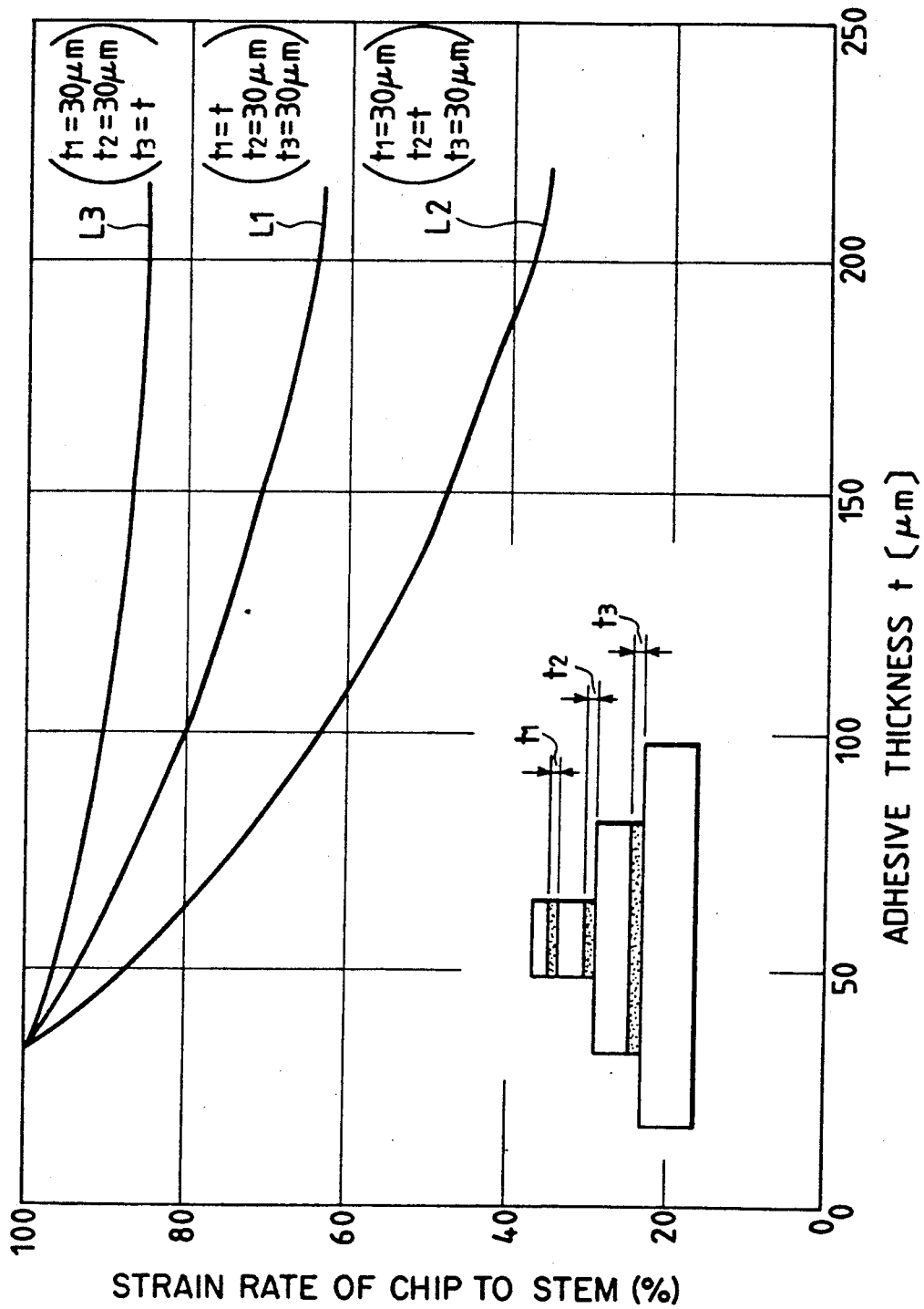
FIG. 12 shows the relation between the rate of the chip strain to the stem strain and the thickness of the adhesive.

Here, a description will be made with reference to FIG. 12 in terms of the reason that the glass beads 37 are added to the adhesive 24 for coupling of the thick-film substrate 23 and the silicon seat 25. FIG. 12 shows characteristic lines L1, L2 and L3 representing the rate of the strain of the sensor chip 27 to the strain of the stem flat plate under the conditions that one of the thicknesses of the adhesives 22, 24 and 26 is arranged to be different from the others. In FIG. 12, the rate of strain value becomes 100% (i.e. 1:1) when t1, t2 and t3 are respectively 30 μm. As obvious from the FIG. 12, when the thickness of the adhesive 24 is changed (in the case of the characteristic line L2), more specifically, when the thickness of the adhesive 24 is increased, the strain of the sensor chip 27 can be reduced.

According to this embodiment, the back surface of the stem 21 is flattened before performing the projection welding so as to prevent propagation of the welding strain of the stem 21 into the sensor chip 27. As a result, it is possible to reduce the stress to the sensor chip 27 due to the external force caused by the welding so as to suppress the sensor characteristic variation and improve sensing performance.

Further, according to this embodiment, the stem 21 and the sensor chip 27 are coupled to each other with the glass beads 37 with a predetermined thickness being disposed therebetween, acting as spacing members, and the back surface of the stem 21 is flattened before performing the projection welding. This can surely prevent the propagation of the welding strain of the stem 21 into the sensor chip 27.

Although in this embodiment glass beads 37 are added to the adhesive 24 of the three adhesive layers (22, 24 and 26) which is provided between the thick-film substrate 23 and the silicon seat 25, the present invention is not limited to this embodiment. It is appropriate to add the glass beads 37 to the different adhesives 22 or 26 instead of the adhesive 24 add the glass beads 37 to the different adhesive 22 and 26, or add the glass beads 37 to all of the adhesives 22, 24 and 26. Moreover, although in this embodiment the glass beads 37 are added to the adhesive 24, it is also appropriate to add, instead of the glass beads 37, different members thereto, which have a predetermined thickness or diameter Similarly, the gaps formed therebetween are filled with the adhesive 24.

A description will be made hereinbelow in terms of a second embodiment of this invention. One feature of the second embodiment is that the back surface of the stem 21 is not flattened and the glass beads (spacing members) 37 are not used, and the projection welding is performed under control of the atmosphere temperature whereby the welding strain of the stem 21 is prevented from propagating into the sensor chip 27. That is, taking into account the fact that the modulus of elasticity of the epoxy resin is rapidly decreased at the vicinity of the glass transition point, the strain produced by projection welding is effected when the atmosphere temperature is relatively high, 100° to 150° C., thereby preventing the propagation of the welding strain into the sensor chip 27. An example of such treatment is where the adhesive is treated by an appropriate device such as heat gun and a drier to have a temperature at about of the glass transition point before performing the projection welding.

According to the present invention, it is possible to prevent generation of a crack with respect to the sensor chip. Without the above-described arrangement, there is a possibility that cracks will be produced in a sensor chip.

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention. For example, although the description of this invention is made for semiconductor accelerometers, this invention is also applicable to a pressure sensor. In the case of being applied to the accelerometer, the present invention provides advantages in terms of stress reduction and crack preventation. On the other hand, in the case of being applied to the pressure sensor, the invention provides advantages in terms of stress reduction and lowering the height of the seat which results in size-reduction and cost-reduction. Although, in the case of the accelerometer, the shell is used in order to hermetically seal the damping liquid, in the case of the pressure sensor, the shell is used for improving air tightness.

What is claimed is:

1. A semiconductor accelerometer comprising:
   a stem having a front and back surface;
   a sensor chip for sensing acceleration and bonded to said front surface of said stem by an adhesive, said adhesive having a thickness of 100 to 200 μm; and
   a shell for covering said sensor chip attached to said front surface of said stem by a projection welding technique.

2. A semiconductor strain sensor as in claim 1, wherein at least one lead hole extends from said front surface to said back surface of said stem, and at least one lead terminal is installed in said at least one lead hole; said at least one lead terminal electrically coupled to said sensor chip to output strain values to an external circuit; and
   said sensor chip comprises piezo-resistors.

3. A semiconductor accelerometer as claimed in claim 1, wherein a thick-film substrate and a seat are provided between said stem and said sensor chip, said thick-film substrate and said seat being coupled to each other through an adhesive having a thickness which is equal to or above 100 μm and below 200 μm.

4. A semiconductor accelerometer comprising:
   a stem having a front and back surface;
   a sensor chip for sensing acceleration and bonded to said front surface of said stem by an adhesive;
   spacing means added to said adhesive for maintaining said adhesive at a thickness of 100 to 200 μm; and
   a shell for covering said sensor chip attached to said front surface of said stem by a projection welding technique.

5. A semiconductor strain sensor as in claim 4, wherein at least one lead hole extends from said front surface to said back surface of said stem, and at least one lead terminal is installed in said at least one lead hole; said at least one lead terminal electrically coupled to said sensor chip to output strain values to an external circuit; and
   said sensor chip comprises piezo-resistors.

* * * * *